(12) United States Patent
Sobanski et al.

(10) Patent No.: US 11,415,009 B2
(45) Date of Patent: Aug. 16, 2022

(54) VANE WITH PIN MOUNT AND ANTI-ROTATION STABILIZER ROD

(71) Applicant: RAYTHEON TECHNOLOGIES CORPORATION, Farmington, CT (US)

(72) Inventors: Jon E. Sobanski, Glastonbury, CT (US); Bryan H. Farrar, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/150,184

(22) Filed: Jan. 15, 2021

(65) Prior Publication Data

US 2022/0228499 A1    Jul. 21, 2022

(51) Int. Cl.
*F01D 9/04* (2006.01)
*F02C 3/04* (2006.01)

(52) U.S. Cl.
CPC ............... *F01D 9/041* (2013.01); *F02C 3/04* (2013.01); *F05D 2240/12* (2013.01); *F05D 2240/35* (2013.01); *F05D 2260/31* (2013.01); *F05D 2260/38* (2013.01)

(58) Field of Classification Search
CPC ........ F01D 9/041; F02C 3/04; F05D 2240/12; F05D 2240/35; F05D 2260/31; F05D 2260/38
See application file for complete search history.

(56) References Cited

U.S. PATENT DOCUMENTS

| 4,987,736 A | * | 1/1991 | Ciokajlo | ................. F01D 9/065 60/797 |
| 6,000,906 A | * | 12/1999 | Draskovich | ........... F01D 17/162 415/209.4 |

(Continued)

FOREIGN PATENT DOCUMENTS

| EP | 3121379 | 1/2017 |
| EP | 3805525 | 4/2021 |

(Continued)

OTHER PUBLICATIONS

European Search Report for European Patent Application No. 22151407.8 dated Mar. 15, 2022.

*Primary Examiner* — Jesse S Bogue
(74) *Attorney, Agent, or Firm* — Carlson, Gaskey & Olds, P.C.

(57) ABSTRACT

A vane arc segment includes an airfoil fairing that has first and second fairing platforms and a hollow airfoil section extending there between. There is a spar having a spar platform adjacent the first fairing platform and a spar leg that extends from the spar platform and through the hollow airfoil section. The spar leg has an end portion with a clevis mount that that protrudes from the second fairing platform. A support platform adjacent the second fairing platform has first and second through-holes. The end portion of the spar leg extends through the first through-hole and a pin extends though the clevis mount to lock the support platform to the spar leg. A stabilizer rod extends through the second through-hole of the support platform and limits rotation of the support platform about the pin.

17 Claims, 5 Drawing Sheets

(56) References Cited

U.S. PATENT DOCUMENTS

| | | | |
|---|---|---|---|
| 7,326,030 B2* | 2/2008 | Albrecht | F01D 5/147 |
| | | | 415/115 |
| 9,863,260 B2* | 1/2018 | Weaver | F01D 9/041 |
| 9,915,159 B2* | 3/2018 | Huizenga | F01D 25/16 |
| 9,920,641 B2* | 3/2018 | Farah | F01D 25/28 |
| 10,309,240 B2* | 6/2019 | Heitman | F01D 9/042 |
| 11,008,880 B2* | 5/2021 | Whittle | F01D 25/005 |
| 2010/0068034 A1 | 3/2010 | Schiavo et al. | |
| 2016/0201512 A1* | 7/2016 | Bauer | F01D 5/02 |
| | | | 415/208.1 |
| 2017/0022833 A1* | 1/2017 | Heitman | F01D 9/041 |
| 2018/0163552 A1* | 6/2018 | Reynolds | F01D 5/282 |
| 2021/0108525 A1* | 4/2021 | Jarrossay | F01D 9/041 |

FOREIGN PATENT DOCUMENTS

| | | |
|---|---|---|
| FR | 3098246 | 1/2021 |
| GB | 2235253 | 8/1989 |
| JP | S6189908 | 5/1986 |

* cited by examiner

VANE WITH PIN MOUNT AND ANTI-ROTATION STABILIZER ROD

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing that has first and second fairing platforms and a hollow airfoil section that extends there between. A spar has a spar platform adjacent the first fairing platform and a spar leg that extends from the spar platform and through the hollow airfoil section. The spar leg has an end portion that is distal from the platform and that protrudes from the second fairing platform. The end portion has a clevis mount. A support platform adjacent the second fairing platform has first and second through-holes. The end portion of the spar leg extends through the first through-hole such that the clevis mount protrudes from the support platform. A pin extends through the clevis mount and locks the support platform to the spar leg such that the airfoil fairing is trapped between the spar platform and the support platform. The support platform has a tendency to rotate about the pin under the aerodynamic load received from the airfoil fairing. A stabilizer rod extends through the second through-hole of the support platform. The stabilizer rod limits rotation of the support platform about the pin.

In a further embodiment of any of the foregoing embodiments, the stabilizer rod includes first and second ends. The first end has a head that is engaged with the support platform at the second through-hole, and the second end is attached to the spar platform.

In a further embodiment of any of the foregoing embodiments, the head is a ball.

In a further embodiment of any of the foregoing embodiments, head includes a pinhole and a lock pin through the pinhole, the lock pin is engaged with the support platform.

In a further embodiment of any of the foregoing embodiments, the second end includes threads and a nut.

As A further embodiment of any of the foregoing embodiments includes a spring disposed on the second end between the nut and the spar platform.

In a further embodiment of any of the foregoing embodiments, the stabilizer rod is straight and solid.

In a further embodiment of any of the foregoing embodiments, the support platform includes a forward end and an aft end, and the second through-hole is between the first through-hole and the aft end.

In a further embodiment of any of the foregoing embodiments, the support platform includes a forward end, and aft end, and a span defined from the forward end to the aft end, with 0% span being at the forward end and 100% span being at the aft end. The pin is located in a range of 10% span to 45% span, and the stabilizer bar is located in a range of 55% span to 95% span.

In a further embodiment of any of the foregoing embodiments, a difference in span between the location of the stabilizer bar and the location of the pin is from 15% to 60%.

In a further embodiment of any of the foregoing embodiments, the airfoil fairing is formed of ceramic.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segment includes an airfoil fairing that has first and second fairing platforms and a hollow airfoil section extending there between. A spar has a spar platform adjacent the first fairing platform and a spar leg that extends from the spar platform and through the hollow airfoil section. The spar leg has an end portion that is distal from the platform and that protrudes from the second fairing platform, the end portion having a clevis mount. A support platform adjacent the second fairing platform has first and second through-holes. The end portion of the spar leg extends through the first through-hole such that the clevis mount protrudes from the support platform. A pin extends though the clevis mount and locks the support platform to the spar leg such that the airfoil fairing is trapped between the spar platform and the support platform. The support platform has a tendency to rotate about the pin under the aerodynamic load received from the airfoil fairing. A stabilizer rod extends through the second through-hole of the support platform. The stabilizer rod limits rotation of the support platform about the pin.

In a further embodiment of any of the foregoing embodiments, the stabilizer rod includes first and second ends, the first end has a head that is engaged with the support platform at the second through-hole, and the second end is attached to the spar platform.

In a further embodiment of any of the foregoing embodiments, head includes a pinhole and a lock pin through the pinhole. The lock pin is engaged with the support platform.

In a further embodiment of any of the foregoing embodiments, the second end includes threads and a nut.

A further embodiment of any of the foregoing embodiments includes a spring disposed on the second end between the nut and the spar platform.

In a further embodiment of any of the foregoing embodiments, the support platform includes a forward end and an aft end, and the second through-hole is between the first through-hole and the aft end.

In a further embodiment of any of the foregoing embodiments, the support platform includes a forward end, and aft end, and a span defined from the forward end to the aft end, with 0% span being at the forward end and 100% span being at the aft end. The pin is located in a range of 10% span to 45% span, and the stabilizer bar is located in a range of 55% span to 95% span.

In a further embodiment of any of the foregoing embodiments, a difference in span between the location of the stabilizer bar and the location of the pin is from 15% to 60%.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
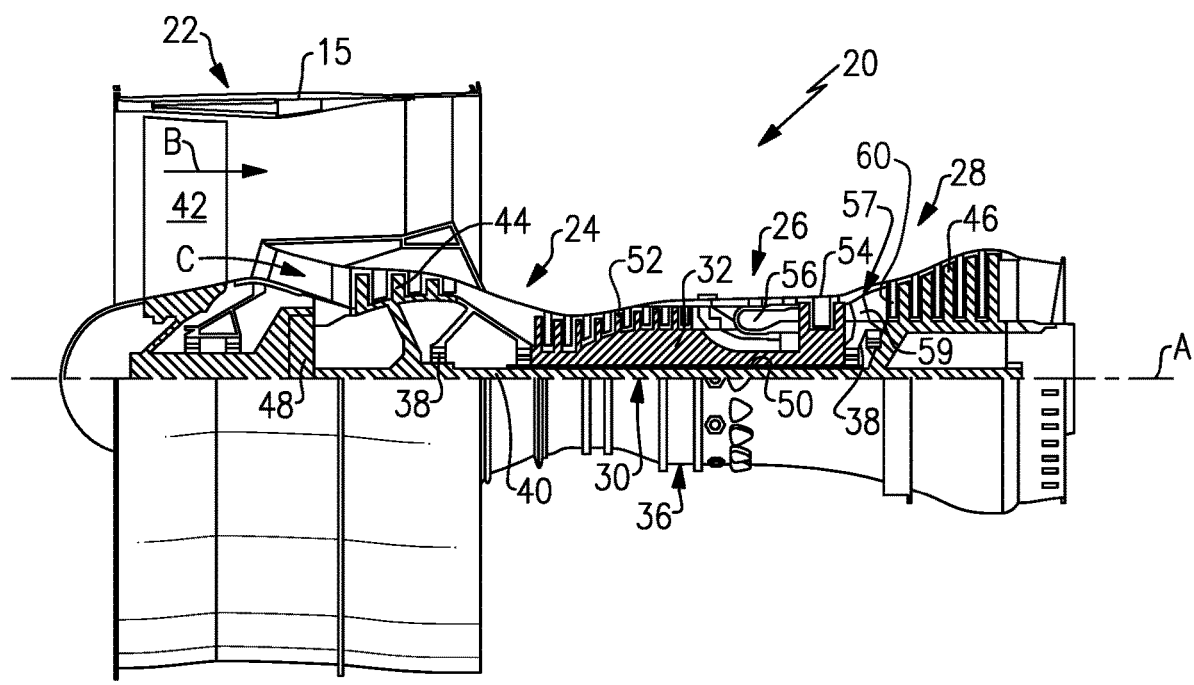
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
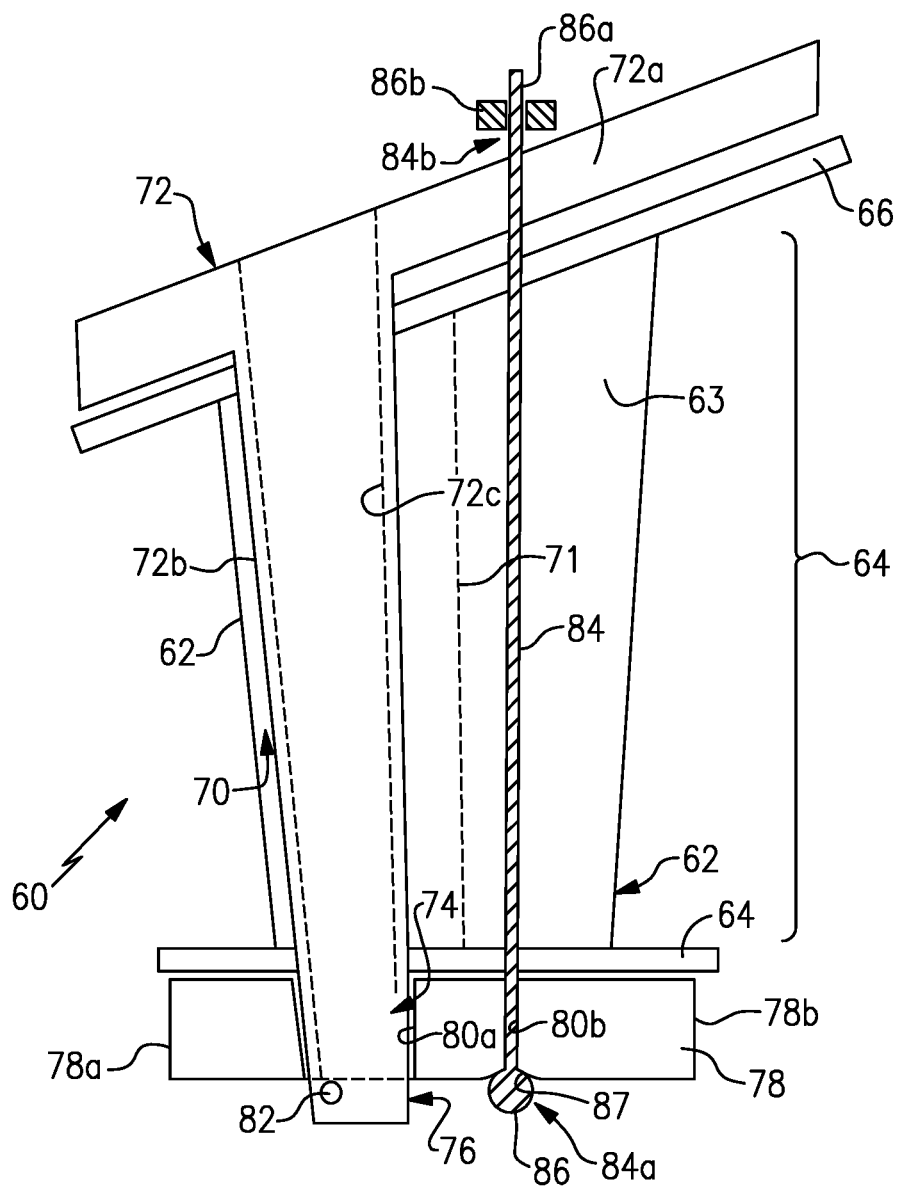
FIG. 2 illustrates a vane arc segment of the turbine engine.

FIG. 2 illustrates a line representation of an example of a vane arc segment 60 from the turbine section 28 of the engine 20 (see also FIG. 1). It is to be understood that although the examples herein are discussed in context of a vane from the turbine section, the examples can be applied to other vanes that have support spars.

The vane arc segment 60 includes an airfoil fairing 62 that is formed by an airfoil wall 63. The airfoil fairing 62 is comprised of an airfoil section 64 and first and second platforms 66/68 between which the airfoil section 64 extends. The airfoil section 64 generally extends in a radial direction relative to the central engine axis A. The terms such as "inner" and "outer" refer to location with respect to the central engine axis A, i.e., radially inner or radially outer.

The airfoil wall 63 is continuous in that the platforms 66/68 and airfoil section 64 constitute a one-piece body. As an example, the airfoil wall 63 is formed of a ceramic material, an organic matrix composite (OMC), or a metal matrix composite (MMC). For instance, the ceramic material is a monolithic ceramic or a ceramic matrix composite (CMC) that is formed of ceramic fibers that are disposed in a ceramic matrix. The monolithic ceramic may be, but is not limited to, SiC or other silicon-containing ceramic. The ceramic matrix composite may be, but is not limited to, a SiC/SiC ceramic matrix composite in which SiC fibers are disposed within a SiC matrix. Example organic matrix composites include, but are not limited to, glass fiber, carbon fiber, and/or aramid fibers disposed in a polymer matrix, such as epoxy. Example metal matrix composites include, but are not limited to, boron carbide fibers and/or alumina fibers disposed in a metal matrix, such as aluminum. The fibers may be provided in fiber plies, which may be woven or unidirectional and may collectively include plies of different fiber weave configurations.

The airfoil section 64 circumscribes an interior through-cavity 70. The airfoil section 64 may have a single through-cavity 70, or the cavity 70 may be divided by one or more ribs 71. The vane arc segment 60 further includes a spar 72 that extends through the through-cavity 70 and mechanically supports the airfoil fairing 62. The spar 72 includes a spar platform 72a and a spar leg 72b that extends from the spar platform 72a into the through-cavity 70. Although not shown, the spar platform 72a includes attachment features that secure it to a fixed support structure, such as an engine case. The spar leg 72b defines an interior through-passage 72c.

Cooling air, such as bleed air from the compressor section 24, is conveyed into and through the through-passage 72c of the spar 72. This cooling air is destined for a downstream cooling location, such as a tangential onboard injector (TOBI). Cooling air may also be provided into cavity 70 in the gap between the airfoil wall 63 and the spar leg 72b. The through-passage 72c is fully or substantially isolated from the gap. Thus, the cooling air in the through-passage 72c generally does not intermix with cooling air in the gap.

The spar leg 72b has a distal end portion 74 that has a clevis mount 76. The end portion 74 of the spar leg 72b extends past the platform 68 of the airfoil fairing 62 so as to protrude from the airfoil fairing 62. There is a support platform 78 adjacent the platform 68 of the airfoil fairing 62. Although not shown, the support platform 78, the platform 68 of the airfoil fairing 62, or both may have flanges or other mounting features that are not shown, and through which the support platform 78 interfaces with the platform 68.

The support platform 78 includes a first through-hole 80a through which the end portion 74 of the spar leg 72b extends such that the clevis mount 76 protrudes from the support platform 78. A pin 82 extends though the clevis mount 76. The pin 82 is wider than the through-hole 80. The ends of the pin 82 thus abut the face of the support platform 78 and thereby prevent the spar leg 72b from being retracted into the through-hole 80. The pin 82 thus locks the support platform 78 to the spar leg 72b such that the airfoil fairing 62 is mechanically trapped between the spar platform 72a and the support platform 78. The spar 72 may be formed of a relatively high temperature resistance, high strength material, such as a single crystal metal alloy (e.g., a single crystal nickel- or cobalt-alloy).

Figure 3:
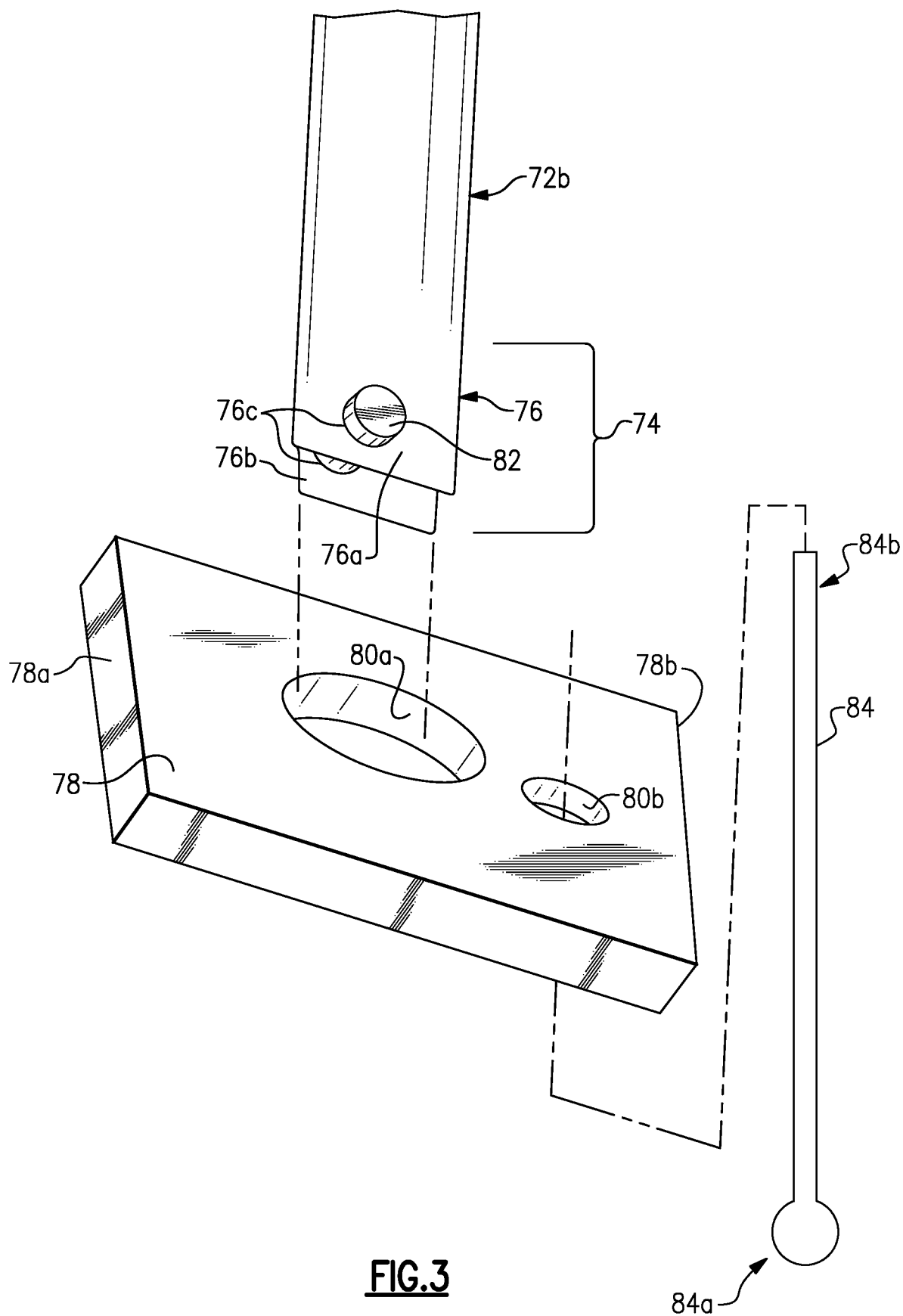
FIG. 3 illustrates an expanded view of a spar and support platform of a vane arc segment.

Referring also to the expanded view in FIG. 3 of the end portion 74 of the spar leg 72b and the support platform 78, the clevis mount 76 includes first and second prongs 76a/76b that have respective pin holes 76c that are coaxially aligned with each other. The pin 82 is disposed in the pin holes 76c (after the clevis mount 76 is received through the through-hole 80 in the support platform 78). The prongs 76a/76b are spaced apart so as to form a forked configuration. The through-passage 72c of the spar leg 72b extends between the prongs 76a/76b. The clevis mount 76 thus also serves as an outlet of the through-passage 72c. Alternatively, rather than both prongs 76a/76b having pin holes, only one of the prongs 76a/76b has a pin hole, or the prongs 76a/76b may converge into a single prong that has the hole 80. It is to be appreciated that a "clevis mount" as used herein refers to a fastening system in which there is a prong (e.g., FIG. 5), or more than one prong (e.g., FIGS. 3 and 6), that receives a pin there through in order to fasten the support platform 78 and the spar leg 72b together.

The support platform 78 further includes a second through-hole 80b, a forward end 78a, and an aft end 78b. For reasons that will become apparent below, the second through-hole 80b is between the first through-hole 80a and the aft end 78b.

A stabilizer rod 84 extends through the cavity 70 of the airfoil fairing 62 and through the second through-hole 80b of the support platform 78. In this example, the stabilizer rod 84 is a straight, solid rod of circular cross-section and may be formed of a nickel- or cobalt-based superalloy. For reduced weight, the stabilizer rod 84 may alternatively be hollow, and/or the stabilizer rod 84 may be curved or include bends so as to fit the geometry of the cavity 70 in the airfoil fairing 62. The-cross-sectional shape is not particularly limited and may alternatively be, but is not limited to, rectangular, other polygonal shape, oval, or stadium.

The stabilizer rod 84 includes first and second ends 84a/84b. The first end 84a has a head 86 that is engaged with a complementary pocket 87 in the support platform 78 at the second through-hole 80b (FIG. 2). In this example, the head 86 is a ball (spherical), and the pocket 87 thus has a partially spherical shape such that the ball nests therein. The head 86, however, may have other geometries, such as but not limited to, polygonal shapes or rounded non-spherical shapes. In that regard, the pocket 87 may have a complementary partial polygonal or partial rounded non-spherical shape that matches. The second end 84b is attached to the spar platform 72a. For example, the second end 84a includes threads 86a and a nut 86b that serve to secure the stabilizer rod 84 to the spar 72. The position of the nut 86b may also be adjusted in order to set the size of radial gaps in the vane arc segment 60, such as a radial gap between the fairing platform 66 and the spar platform 72a.

Figure 4:
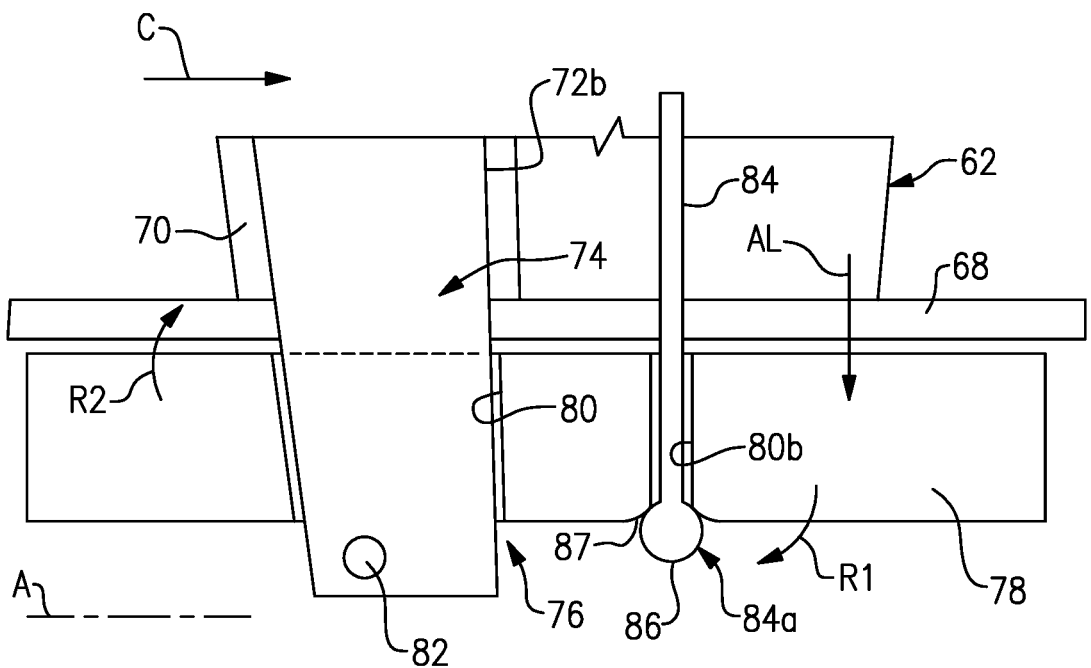
FIG. 4 illustrates a view of a clevis mount and stabilizer rod of the vane arc segment.

FIG. 4 illustrates a local view of the end portion 74 of the spar leg 72b, the first end 84a of the stabilizer rod 84, and the support platform 78. When the engine 20 is running, flow in the core gas path C subjects the airfoil fairing 62 to aerodynamic loads. The aerodynamic loads are reacted out of the airfoil fairing 62 to the spar 72. In this example, the aerodynamic load tends to urge the airfoil fairing 62 in an aft and radially inward direction.

At least a portion of the radial component of the aerodynamic load, represented at AL, is reacted radially inwardly from the airfoil fairing 62 to the support platform 78. However, the pin 82 abuts the underside of the support platform 78 and thereby radially constrains the support platform 78. As a result, since this radial component of the aerodynamic load AL is located toward the aft end of the support platform 78, the support platform 78 has the tendency to teeter on the pin 82 and thus rotate, as indicated at R1 (clockwise in the illustrated example). If permitted to rotate, the forward end of the support platform 78 would tend to rotate radially outwards, as indicated at R2, and exert the load on the forward end of the platform 68 of the airfoil fairing 62. Such a load condition is undesired because it increases the stress on the airfoil fairing 62.

In order to facilitate reductions in such loads, the stabilizer rod 84 serves as an anti-rotation feature and limits rotation of the support platform 78 about the pin 82. The stabilizer rod 84 is secured to the spar platform 72a. Thus, when the support platform 78 rotates or tends to rotate, it encounters the head 86 of the stabilizer rod 84. As the spar 72 is fixed, the head 86 of the stabilizer rod 84 stops the support platform 78 from rotation and thereby prevents the forward end of the support platform 78 from rotating into the forward end of the platform 68. The load is thus reacted through the pin 82 to the spar leg 72b instead of to the platform 68 of the airfoil fairing 62.

In further examples, the pin 82 and the stabilizer rod 84 are spaced at least a minimum distance apart. For example, there is a span defined from the forward end 78a of the support platform 78 to the aft end 78b, with 0% span being at the forward end 78a and 100% span being at the aft end 78b. The pin 82 is located in a range of 10% span to 45% span, and the stabilizer rod 84 (as taken at the head 86) is located in a range of 55% span to 95% span. In one further example, the difference in span between the location of the head 86 of the stabilizer rod 84 and the location of the pin 82 is at least 15%, and may be up to about 60%. Larger differences may be possible in some instances, however, the available design space may limit how far apart the pin 82 and the head 86 can be. Within the available design space, the axial distance between the pin 82 and the head 86 may be maximized in order to increase the mechanical advantage and reduce loads, while relatively shorter distances may impart relatively higher loads on the stabilizer rod 84.

It is to be appreciated that the example configuration may be adapted for other aerodynamic load conditions. For instance, if the aerodynamic load on the airfoil fairing 62 were instead reacted into the forward end of the support platform 78, the stabilizer rod 84 would instead be forward of the spar leg 72b. That is, since the support platform 78 teeters about the pin 82, the stabilizer rod 84 is located on the opposite side of the pin 82 from the location at which the load is transmitted into the spar support 78. Moreover, if the aerodynamic load on the airfoil fairing 62 were instead transmitted radially outwards, the example configuration could be used in an inverted arrangement, with the spar 72 being inverted such that the spar platform 72a is adjacent the platform 68 and the support platform 78 is adjacent the platform 66.

The stabilizer rod 84 permit the loads to be borne by the spar 72 instead of the platform of the airfoil fairing 62. As a result, there may also be additional design flexibility in the positioning of the spar leg 72b, since the spar leg 72b need not be centrally located in order to balance the loads reacted out at the support platform 78.

Figure 5:
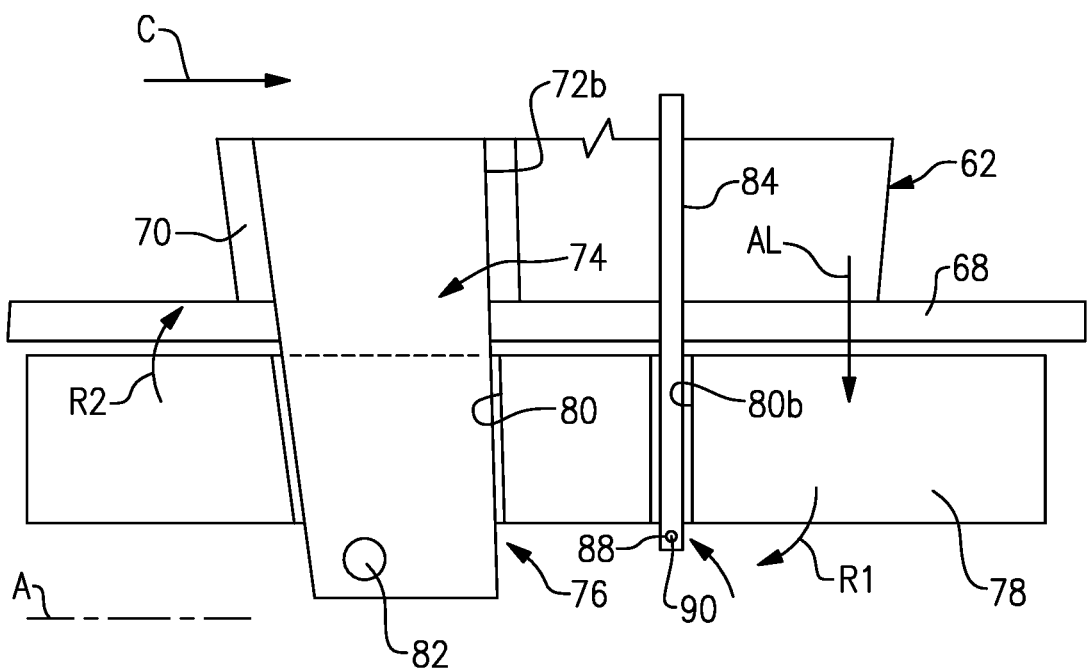
FIG. 5 illustrates another example of a stabilizer rod.

FIG. 5 illustrates another example in which, rather than the ball at the first end 84a of the stabilizer rod, the head 86 includes a pinhole 88 and a lock pin 90 through the pinhole 88. For instance, similar to the ball, the lock pin 90 engages the face of the support platform 78 to limit rotation. As will be appreciated, the head 86 may have other configurations as long as there is an aspect that is larger than the second through-hole 80b such that the head 86 of the stabilizer rod 84 takes the rotational load from the support platform 78.

Figure 6:
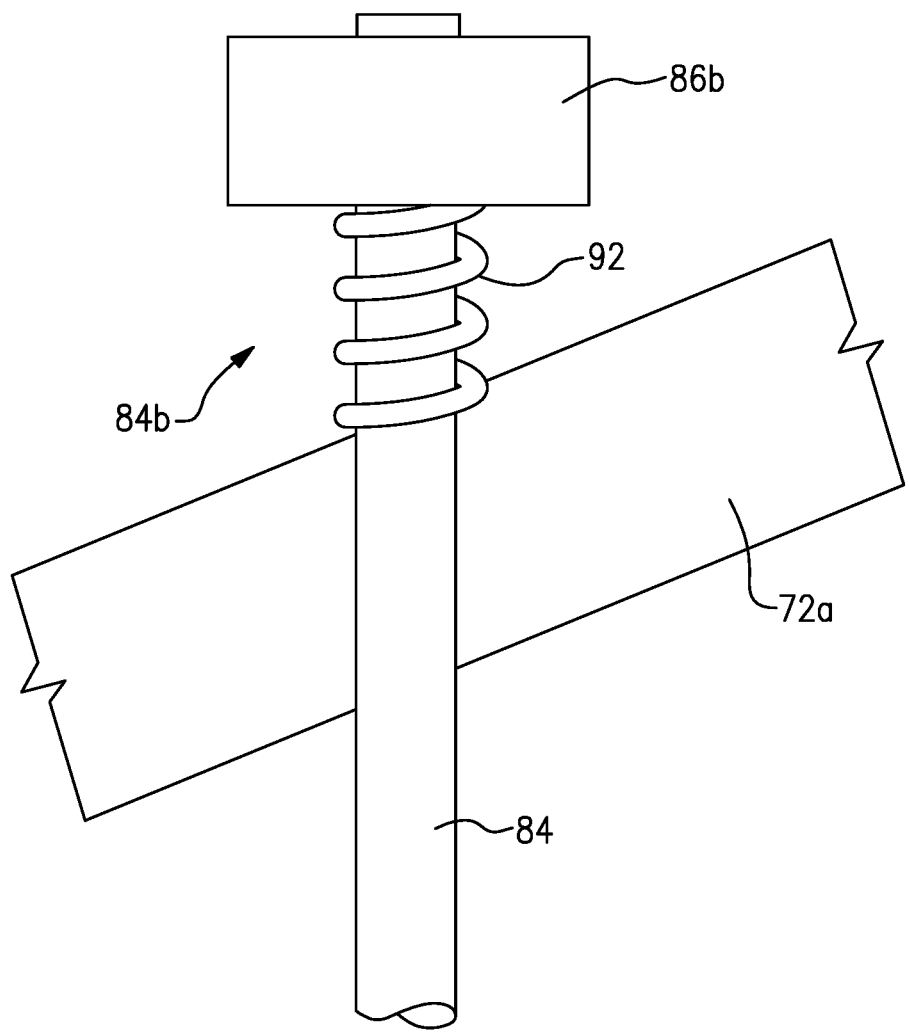
FIG. 6 illustrates a stabilizer rod with a spring.

FIG. 6 illustrates another example that can be used in any of the prior examples. In this example, there is a spring 92 disposed on the second end 84b of the stabilizer rod 84 between the nut 86b and the spar platform 72a. The airfoil fairing 62, the spar 72, and the stabilizer rod 84 thermally expand and contract with changing temperatures in the engine 20. Due to differences in the coefficients of thermal expansion between these components, there may be differential expansions and contractions. The spring 92 compresses or extends in order to take up such differences and maintain tension on the stabilizer rod 84 and thereby maintain a clamping force between the spar 72 and the support platform 78. In addition to thermal mismatches, the spring 92 permits a controlled "preload" of the vane arc segment 60 in the assembly stage, which may facilitate proper positioning. It will also allow for mismatch of tolerances between components and may act as a strain device to control load/deflections on the vanes during operation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil fairing having first and second fairing platforms and a hollow airfoil section extending there between;
   a spar having a spar platform adjacent the first fairing platform and a spar leg that extends from the spar platform and through the hollow airfoil section, the spar leg having an end portion that is distal from the platform and that protrudes from the second fairing platform, the end portion having a clevis mount;
   a support platform adjacent the second fairing platform, the support platform having first and second through-holes, the end portion of the spar leg extending through the first through-hole such that the clevis mount protrudes from the support platform;
   a pin extending through the clevis mount and locking the support platform to the spar leg such that the airfoil fairing is trapped between the spar platform and the support platform, the support platform having a tendency to rotate about the pin under aerodynamic loads received from the airfoil fairing; and
   a stabilizer rod extending through the second through-hole of the support platform, the stabilizer rod limiting rotation of the support platform about the pin, the stabilizer rod including first and second ends, the first end having a head that is engaged with the support platform at the second through-hole, the second end is attached to the spar platform, the head including a pinhole and a lock pin through the pinhole, and the lock pin is engaged with the support platform.

2. The vane arc segment as recited in claim 1, wherein the second end includes threads and a nut.

3. The vane arc segment as recited in claim 2, further comprising a spring disposed on the second end between the nut and the spar platform.

4. The vane arc segment as recited in claim 1, wherein the stabilizer rod is straight and solid.

5. The vane arc segment as recited in claim 1, wherein the support platform includes a forward end and an aft end, and the second through-hole is between the first through-hole and the aft end.

6. The vane arc segment as recited in claim 1, wherein the support platform includes a forward end, and aft end, and a span defined from the forward end to the aft end, with 0% span being at the forward end and 100% span being at the aft end, the pin is located in a range of 10% span to 45% span, and the stabilizer bar is located in a range of 55% span to 95% span.

7. The vane arc segment as recited in claim 6, wherein a difference in span between the location of the stabilizer bar and the location of the pin is from 15% to 60%.

8. The vane arc segment as recited in claim 1, wherein the airfoil fairing is formed of ceramic.

9. A gas turbine engine comprising:
a compressor section;
a combustor in fluid communication with the compressor section; and
a turbine section in fluid communication with the combustor, the turbine section having vane arc segments disposed about a central axis of the gas turbine engine, each of the vane arc segment includes:
an airfoil fairing having first and second fairing platforms and a hollow airfoil section extending there between;
a spar having a spar platform adjacent the first fairing platform and a spar leg that extends from the spar platform and through the hollow airfoil section, the spar leg having an end portion that is distal from the platform and that protrudes from the second fairing platform, the end portion having a clevis mount;
a support platform adjacent the second fairing platform, the support platform having first and second through-holes, the end portion of the spar leg extending through the first through-hole such that the clevis mount protrudes from the support platform;
a pin extending though the clevis mount and locking the support platform to the spar leg such that the airfoil fairing is trapped between the spar platform and the support platform, the support platform having a tendency to rotate about the pin under aerodynamic loads received from the airfoil fairing; and
a stabilizer rod extending through the second through-hole of the support platform, the stabilizer rod limiting rotation of the support platform about the pin, the support platform including a forward end, an aft end, and a span defined from the forward end to the aft end, with 0% span being at the forward end and 100% span being at the aft end, the pin is located in a range of 10% span to 45% span, the stabilizer bar is located in a range of 55% span to 95% span, and a difference in span between the location of the stabilizer bar and the location of the pin is from 15% to 60%.

10. The gas turbine engine as recited in claim 9, wherein the stabilizer rod includes first and second ends, the first end has a head that is engaged with the support platform at the second through-hole, and the second end is attached to the spar platform.

11. The gas turbine engine as recited in claim 10, wherein head includes a pinhole and a lock pin through the pinhole, the lock pin is engaged with the support platform.

12. The gas turbine engine as recited in claim 10, wherein the second end includes threads and a nut.

13. The gas turbine engine as recited in claim 12, further comprising a spring disposed on the second end between the nut and the spar platform.

14. The gas turbine engine as recited in claim 9, wherein the support platform includes a forward end and an aft end, and the second through-hole is between the first through-hole and the aft end.

15. A vane arc segment comprising:
an airfoil fairing having first and second fairing platforms and a hollow airfoil section extending there between;
a spar having a spar platform adjacent the first fairing platform and a spar leg that extends from the spar platform and through the hollow airfoil section, the spar leg having an end portion that is distal from the platform and that protrudes from the second fairing platform, the end portion having a clevis mount;
a support platform adjacent the second fairing platform, the support platform having first and second through-holes, the end portion of the spar leg extending through the first through-hole such that the clevis mount protrudes from the support platform;
a pin extending through the clevis mount and locking the support platform to the spar leg such that the airfoil fairing is trapped between the spar platform and the support platform, the support platform having a tendency to rotate about the pin under aerodynamic loads received from the airfoil fairing; and
a stabilizer rod extending through the second through-hole of the support platform, the stabilizer rod limiting rotation of the support platform about the pin; and
wherein the support platform includes a forward end and an aft end, and the tendency to rotate is for the forward end to rotate aft and the aft end to rotate forward, wherein there is a radial gap between the support platform and the second fairing platform, the stabilizer rod limiting the rotation of the support platform into the radial gap.

16. The vane arc segment as recited in claim 15, wherein the stabilizer rod includes first and second ends, the first end has a head that is engaged with the support platform at the second through-hole, the second end is attached to the spar platform, and the head is a ball.

17. The vane arc segment as recited in claim 15, wherein the support platform includes a forward end, and aft end, and a span defined from the forward end to the aft end, with 0% span being at the forward end and 100% span being at the aft end, the pin is located in a range of 10% span to 45% span, the stabilizer bar is located in a range of 55% span to 95% span, and a difference in span between the location of the stabilizer bar and the location of the pin is from 15% to 60%.

* * * * *